(12) United States Patent
Luckay et al.

(10) Patent No.: US 10,899,449 B2
(45) Date of Patent: Jan. 26, 2021

(54) SYSTEMS FOR AUTOMATED CARRIAGE OF ITEMS FOR DELIVERY

(71) Applicant: United States Postal Service, Washington, DC (US)

(72) Inventors: Ryan M Luckay, Vienna, VA (US); Robert E Dixon, Jr., Haymarket, VA (US); Gregory Cooil, Arlington, VA (US)

(73) Assignee: United States Postal Service, Washington, DC (US)

( * ) Notice: Subject to any disclaimer, the term of this patent is extended or adjusted under 35 U.S.C. 154(b) by 527 days.

(21) Appl. No.: 15/851,516

(22) Filed: Dec. 21, 2017

(65) Prior Publication Data

US 2018/0170543 A1 Jun. 21, 2018

Related U.S. Application Data

(60) Provisional application No. 62/437,597, filed on Dec. 21, 2016.

(51) Int. Cl.
| | |
|---|---|
| *B64D 1/22* | (2006.01) |
| *B64C 39/02* | (2006.01) |
| *B60R 11/00* | (2006.01) |
| *G05D 1/00* | (2006.01) |
| *G05D 1/02* | (2020.01) |
| *G05D 1/06* | (2006.01) |

(Continued)

(52) U.S. Cl.
CPC ........... *B64D 1/22* (2013.01); *B60R 11/00* (2013.01); *B64C 39/024* (2013.01); *G05D 1/0011* (2013.01); *G05D 1/0202* (2013.01); *G05D 1/0276* (2013.01); *G05D 1/0676* (2013.01); *B60R 2011/004* (2013.01); *B60R 2011/0071* (2013.01); *B62D 33/02* (2013.01); *B62D 55/065* (2013.01); *B64C 2201/128* (2013.01); *B64C 2201/141* (2013.01)

(58) Field of Classification Search
CPC ........................... B64C 2201/128; B64D 1/22
USPC .............. 294/81.56; 410/2; 414/137.1–143.2
See application file for complete search history.

(56) References Cited

U.S. PATENT DOCUMENTS

| | | | | |
|---|---|---|---|---|
| 4,128,267 A | * | 12/1978 | Niblett ...................... | B66C 1/16 294/81.56 |
| 4,267,987 A | * | 5/1981 | McDonnell ............ | B64D 39/00 244/137.4 |

(Continued)

*Primary Examiner* — Brian M O'Hara
*Assistant Examiner* — Michael B. Kreiner
(74) *Attorney, Agent, or Firm* — Knobbe Martens Olson & Bear LLP

(57) ABSTRACT

Methods and systems for attaching and detaching an item satchel from an autonomous delivery unit. An attachment system includes an attachment system frame, and a satchel comprising a plurality of external pins. The attachment system also includes a plurality of hooks, mechanically attached to the frame, each hook including a first engagement surface and a second engagement surface, one or more electric actuators, mechanically attached to the frame, and mechanically connected to the plurality of hooks. Each of the first engagement surfaces engage a corresponding pin of the plurality of external pins at a first position between the horizontal and vertical positions, and each of the second engagement surfaces engage the corresponding pin of the plurality of external pins at the vertical position to secure an item satchel to an autonomous delivery unit.

20 Claims, 12 Drawing Sheets

(51) Int. Cl.
*B62D 33/02* (2006.01)
*B62D 55/065* (2006.01)

(56) References Cited

U.S. PATENT DOCUMENTS

| | | | | |
|---|---|---|---|---|
| 5,232,257 | A * | 8/1993 | Koide | B66C 1/66 |
| | | | | 294/68.27 |
| 5,593,113 | A * | 1/1997 | Cox | B64D 1/08 |
| | | | | 177/245 |
| 6,845,939 | B1 * | 1/2005 | Baldwin | B64C 29/0033 |
| | | | | 244/137.1 |
| 7,159,912 | B2 * | 1/2007 | Gerhausser | B66C 1/12 |
| | | | | 294/81.2 |
| 7,399,019 | B2 * | 7/2008 | Malmgren | B66C 1/663 |
| | | | | 294/81.2 |
| 7,946,530 | B1 * | 5/2011 | Talmage, Jr. | B64D 25/12 |
| | | | | 244/118.2 |
| 8,453,962 | B2 * | 6/2013 | Shaw | B64C 39/024 |
| | | | | 244/17.23 |
| 8,840,355 | B1 * | 9/2014 | Kulesha | B64D 1/22 |
| | | | | 414/626 |
| 8,876,057 | B2 * | 11/2014 | Alber | B64C 27/10 |
| | | | | 244/137.1 |
| 9,174,733 | B1 * | 11/2015 | Burgess | B64D 1/12 |
| 9,452,667 | B2 * | 9/2016 | Harmon | B64D 9/00 |
| 9,688,404 | B1 * | 6/2017 | Buchmueller | G05D 1/0094 |
| 9,849,981 | B1 * | 12/2017 | Burgess | B64D 1/12 |
| 9,852,392 | B2 * | 12/2017 | Srinivasan | G06Q 10/08355 |
| 9,915,956 | B2 * | 3/2018 | Bokeno | B64F 1/362 |
| 10,040,370 | B2 * | 8/2018 | Wei | H01M 10/425 |
| 10,176,722 | B1 * | 1/2019 | Boyd | G08B 25/10 |
| 10,183,845 | B2 * | 1/2019 | Wrycza | B66C 1/66 |
| 10,246,187 | B2 * | 4/2019 | Cantrell | G05D 1/104 |
| 10,249,200 | B1 * | 4/2019 | Grenier | G05D 1/101 |
| 10,410,105 | B1 * | 9/2019 | Stoman | B64D 9/00 |
| 10,471,596 | B2 * | 11/2019 | Sugaki | B25J 5/00 |
| 2013/0240673 | A1 * | 9/2013 | Schlosser | B64D 1/02 |
| | | | | 244/137.1 |
| 2014/0217230 | A1 * | 8/2014 | Helou, Jr. | B64C 39/024 |
| | | | | 244/17.17 |
| 2015/0175276 | A1 * | 6/2015 | Koster | B64F 1/00 |
| | | | | 244/114 R |
| 2016/0236772 | A1 * | 8/2016 | Tang | B64C 39/024 |
| 2018/0016027 | A1 * | 1/2018 | Cheatham, III | G06Q 10/0832 |
| 2018/0196418 | A1 * | 7/2018 | Meier | G05D 1/0225 |
| 2018/0370618 | A1 * | 12/2018 | Harris | B64C 25/12 |
| 2019/0161190 | A1 * | 5/2019 | Gil | B64F 1/02 |
| 2019/0270519 | A1 * | 9/2019 | Qiu | B64C 39/024 |
| 2020/0047353 | A1 * | 2/2020 | Zheng | B25J 15/10 |

\* cited by examiner

SYSTEMS FOR AUTOMATED CARRIAGE OF ITEMS FOR DELIVERY

INCORPORATION BY REFERENCE OF ANY PRIORITY APPLICATIONS

Any and all applications for which a foreign or domestic priority claim is identified in the Application Data Sheet as filed with the present application are hereby incorporated by reference under 37 CFR 1.57. This Application claims the benefit of priority to U.S. application Ser. No. 62/437,597, filed Dec. 21, 2016, the entire contents of which are hereby incorporated by reference.

FIELD

Embodiments relate generally to automated item distribution that includes the use of unmanned delivery or pick-up transportation devices.

BACKGROUND

The capabilities of unmanned vehicles are expanding significantly. Thanks in large part to modern electronic controls, including miniaturized global position system receivers and accelerometers, unmanned vehicles are now able to navigate between two points without human assistance. Furthermore, the revolution in unmanned vehicle design to include multiply redundant electric motors has made unmanned aerial vehicles (UAVs) more reliable and controllable. Unmanned vehicles are already gaining wide spread adoption for military tasks. Proposals to utilize unmanned vehicles for civilian duties are also gaining acceptance. In particular, utilization of unmanned vehicles for delivery and pick-up of items has been suggested as a way to improve delivery times while reducing traffic and pollution associated with traditional forms of truck based item delivery and pick-up. Therefore, improved methods and apparatus for unmanned delivery and pick-up of items are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Methods and apparatus for attachment of items to unmanned vehicles are disclosed. One aspect disclosed is an item attachment system. The system may include an attachment system frame, a satchel comprising a plurality of external pins, a plurality of hooks, mechanically attached to the frame, each hook including a first engagement surface and a second engagement surface, one or more electric actuators, mechanically attached to the frame, and mechanically connected to the plurality of hooks so as to provide for rotation of the hooks between a horizontal and a vertical position, an electronic controller, configured to energize the one or more electric actuators so as to rotate the hooks from the horizontal to the vertical position, such that each of the first engagement surfaces engage a corresponding pin of the plurality of external pins at a first position between the horizontal and vertical positions, and each of the second engagement surfaces engage a corresponding pin of the plurality of external pins at the vertical position.

In a first embodiment, an item attachment system is described. The item attachment system comprises an attachment system frame, a satchel comprising a plurality of external pins, a plurality of hooks, mechanically attached to the frame, each hook comprising a first engagement surface and a second engagement surface, one or more electric actuators, mechanically attached to the frame, and mechanically connected to the plurality of hooks so as to provide for rotation of the hooks between a horizontal and a vertical position, and an electronic controller, configured to energize the one or more electric actuators so as to rotate the hooks from the horizontal to the vertical position, such that each of the first engagement surfaces engages a corresponding pin of the plurality of external pins at a first position between the horizontal and vertical positions, and each of the second engagement surfaces engage the corresponding pin of the plurality of external pins at the vertical position.

In some embodiments, the item attachment system further comprises a fixed latch, mechanically attached to the frame, and configured to horizontally engage a pin of the plurality of pins.

In some embodiments, the satchel comprises a bottom portion and a top portion movably coupled to the bottom portion by a hinge.

In some embodiments, the electronic controller is further configured to rotate the hooks from the vertical position to the horizontal position, so as to release the satchel from the attachment system frame.

In some embodiments, the item attachment system further comprises an autonomous delivery vehicle mechanically attached to the attachment system frame.

In some embodiments, the autonomous delivery vehicle further comprises a control processor configured to detect a signal from a proximity sensor associated with a delivery point, and navigate the autonomous delivery vehicle based on the signal.

In some embodiments, the proximity sensor is located proximate to a receptacle, and the control processor is further configured to navigate the autonomous delivery vehicle to the receptacle based on the signal from the proximity sensor.

In some embodiments, the control processor is further configure to land the autonomous delivery vehicle on an interior platform of the receptacle based on the signal from the proximity sensor.

In some embodiments, the control processor is further configured to move at least a portion of the autonomous delivery vehicle through an opening of the receptacle based on the signal from the proximity sensor.

In some embodiments, the satchel further comprises a beacon generator configured to generate a beacon signal, and the autonomous delivery vehicle further comprises a control processor, the control processor configured to detect the beacon signal and navigate the autonomous delivery vehicle based on the beacon signal.

In a second embodiment, an autonomous delivery vehicle is described. The autonomous delivery vehicle comprises an attachment system and a control processor. The attachment system comprises a plurality of fixed latches, each fixed latch comprising a slot configured to accept an external pin of an item, a plurality of hooks, each hook associated with a corresponding one of the plurality of fixed latches, each hook rotatable between a first orientation in which an external pin can enter or leave the corresponding fixed latch, and a second orientation in which an external pin is prevented from entering or leaving the corresponding fixed latch, and one or more electric actuators mechanically connected to the plurality of hooks, the one or more electric actuators configured to rotate the plurality of hooks between the first orientation and the second orientation. The control processor is configured to detect wireless signals associated with at least one of an item and a delivery point, and navigate the autonomous delivery vehicle based at least in part on the wireless signal.

In some embodiments, each hook comprises a first engagement surface and a second engagement surface, and the control processor is further configured to energize the one or more electric actuators so as to rotate the hooks from the first orientation to the second orientation, such that each of the first engagement surfaces engages a corresponding external pin of the item at a first position between the first orientation and the second orientation, and each of the second engagement surfaces engage the corresponding pin at the second orientation.

In some embodiments, the wireless signals comprise a location signal associated with an item to be picked up, and the control processor is further configured to navigate the autonomous delivery vehicle to a location associated with the location signal, cause the autonomous delivery vehicle to move into a carry position such that a plurality of external pins of the item are engaged within the fixed latches, cause the one or more electronic actuators to rotate the plurality of hooks from the first orientation to the second orientation to secure the item to the autonomous delivery vehicle by retaining the external pins within the fixed latches, and navigate the autonomous delivery vehicle away from the location while the item is secured to the autonomous delivery vehicle.

In some embodiments, the wireless signals comprise a beacon signal emitted from a predetermined location of the item, and the control processor is further configured to cause the autonomous delivery vehicle to move into a carry position relative to the item based at least in part on the beacon signal.

In some embodiments, the wireless signals comprise a location signal associated with a delivery point for an item being carried by the autonomous delivery vehicle, and the control processor is further configured to navigate the autonomous delivery vehicle to a location associated with the location signal, cause the one or more electronic actuators to rotate the plurality of hooks from the second orientation to the first orientation to release the item from the autonomous delivery vehicle by releasing the external pins from the fixed latches, and navigate the autonomous delivery vehicle away from the item.

In some embodiments, the location signal is associated with a receptacle comprising an opening, and the location associated with the location signal comprises a location in which at least a portion of the autonomous delivery vehicle is disposed within the opening and the item is disposed within the receptacle.

In some embodiments, the fixed latches are sized and spaced to accommodate external pins of an item satchel having external pins in a predetermined arrangement compatible with the autonomous delivery vehicle.

In some embodiments, the attachment system further comprises a spring force element configured to retain the hooks in the second orientation.

In some embodiments, the autonomous delivery vehicle comprises an unmanned aerial vehicle.

In some embodiments, the autonomous delivery vehicle further comprises a plurality of wheels for travel along the ground.

BRIEF DESCRIPTION OF THE DRAWINGS

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Methods and systems disclosed provide for automation of item delivery and/or pick-up via the use of autonomous delivery units (ADUs). Items transferred and/or delivered by the systems and methods described herein can be various types of items, for example, parcels, packages, crates, boxes, envelopes, flats, cards, or other items transported by a distribution network such as a postal network, a delivery service, or the like. Items may further include containers, satchels, packages, or other items configured to contain additional items. The methods and systems disclosed may advantageously allow an ADU to securely and autonomously attach and/or detach items without intervention from an operator.

Figure 1:
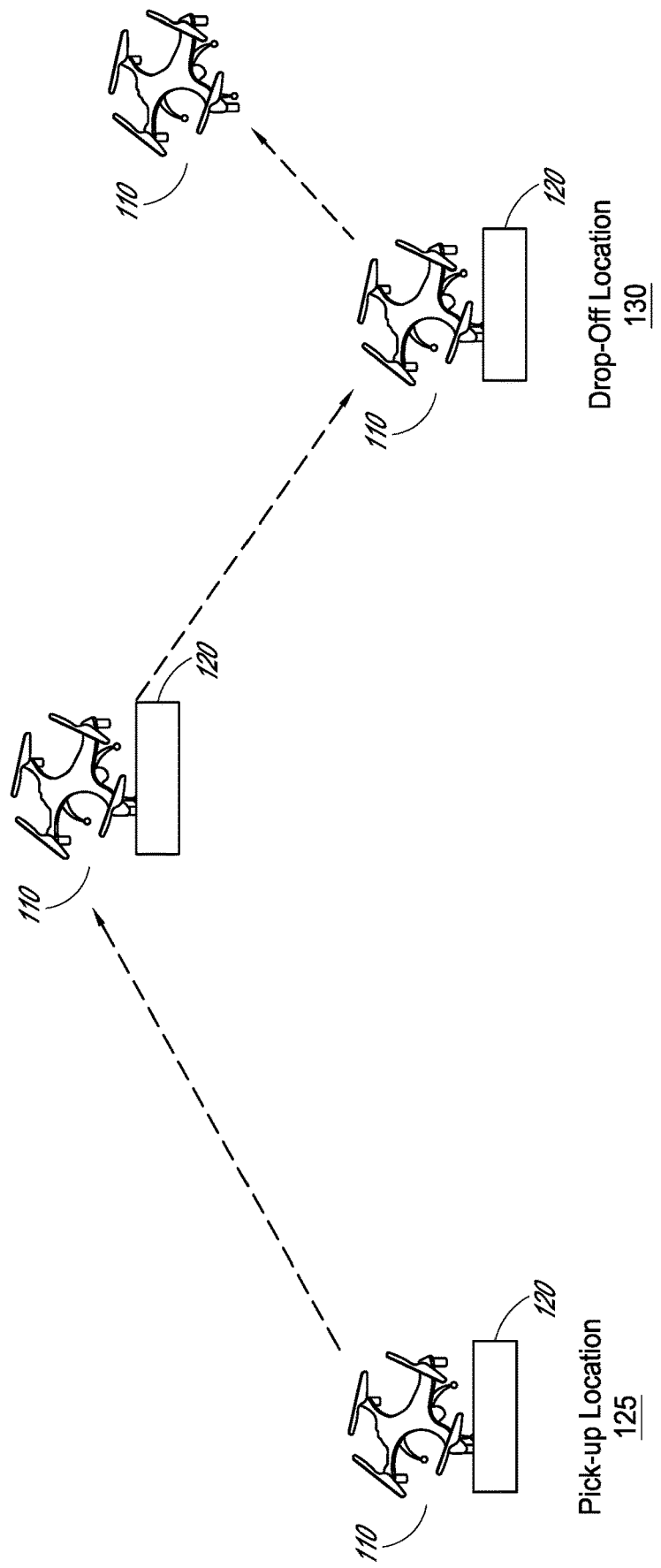
FIG. 1 is an overview diagram of item delivery via an autonomous delivery unit.

FIG. 1 is an overview diagram of an autonomous item attachment system. The item can be any item which is to be transported from an origin or pick-up location 125 to a destination drop off location 130. The pick-up location 125 may be a delivery point, a location at residential address, such as a front porch or other location or receptacle associated with a house, a designated area at a commercial address, a vehicle associated with the ADU 110, such a as a mail delivery vehicle, or other similar area. The drop off location 130 can be a delivery point, an address, a receptacle, a designated area at a particular location, such as at a home or business, a porch, or any other delivery point suitable to receive delivery of the item 120.

As shown, an autonomous delivery unit (ADU) 110 may pick-up the item 120 at the pick-up location 125. The ADU 110 may carry the item 120 to the drop off location 130, at which point, the ADU 110 releases the item 120 and may fly away. In some embodiments, ADUs may also be ground based vehicles configured to travel across the ground. As autonomous item delivery such as that illustrated in FIG. 1 becomes more common, reliable means of quickly and reliably attaching and detaching the item 120 to/from the ADU 110 are needed. The disclosed methods and systems describe item attachment systems that can reliably and securely attach and detach the item 120 to/from the ADU 110.

Figure 2:
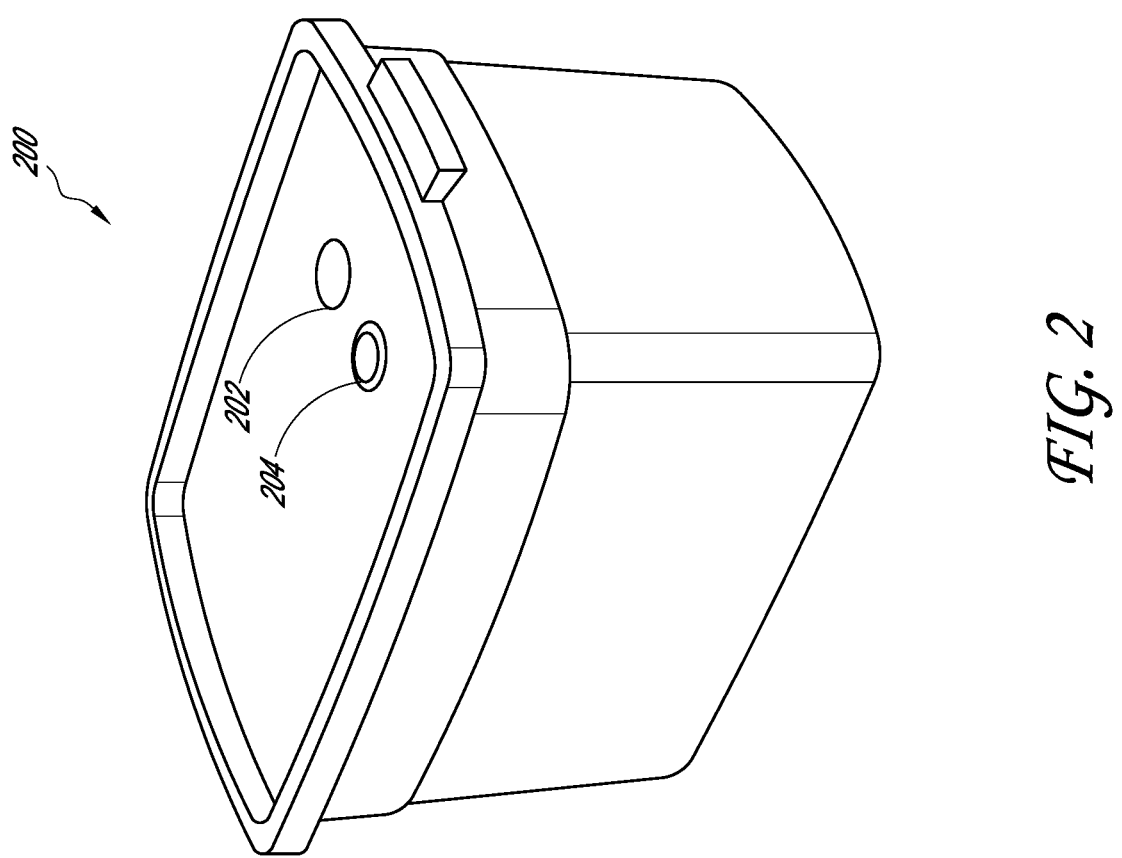
FIG. 2 is exemplary autonomous delivery container.

FIG. 2 is an exemplary autonomous delivery package (ADP). The ADP may contribute to making ADU delivery more efficient. For example, while today's manually delivered items come in a variety of shapes and sizes, human item delivery carriers are easily able to adapt to these various sizes when performing their delivery or pick-up function. ADUs may be less able to accommodate today's wide variety of item sizes and types. The exemplary ADP 200 may include a customized shape so as to fit securely within some embodiments of an ADU or to be carried by other embodiments of an ADU. In some embodiments, the ADP 200 may be equipped with a beacon generator 202 (e.g., a radio transmitter or the like) and configured to emit a beacon signal. The beacon signal may allow a distribution network to locate the ADP 200 and/or to detect when an ADU 110 is carrying an ADP 200. Some aspects of the ADP 200 may include a button 204 operably connected to the beacon generator 202. The button may be configured to activate the radio transmitter, which in response may emit a second signal. For example, in some embodiments, if a person wishes to have an item picked-up, the person can put the item in an ADP 200, or the item can be the ADP 200. The person puts the ADP at a pick-up location 130, such as a front porch, driveway, etc., and pushes the button 204. Pushing the button 204 activates the beacon generator 202, and the beacon generator 202 can begin to transmit a signal recognizable by the distribution network, for example, by an ADU 110, and the ADU 110 can be dispatched to pick up the ADP 200. A distribution network may be configured to retrieve the ADP 200 upon detection of the second signal.

In some embodiments, the ADP 200 may be equivalent to item satchels 402 or 502 discussed below with respect to at least FIGS. 4-7.

Figure 3:
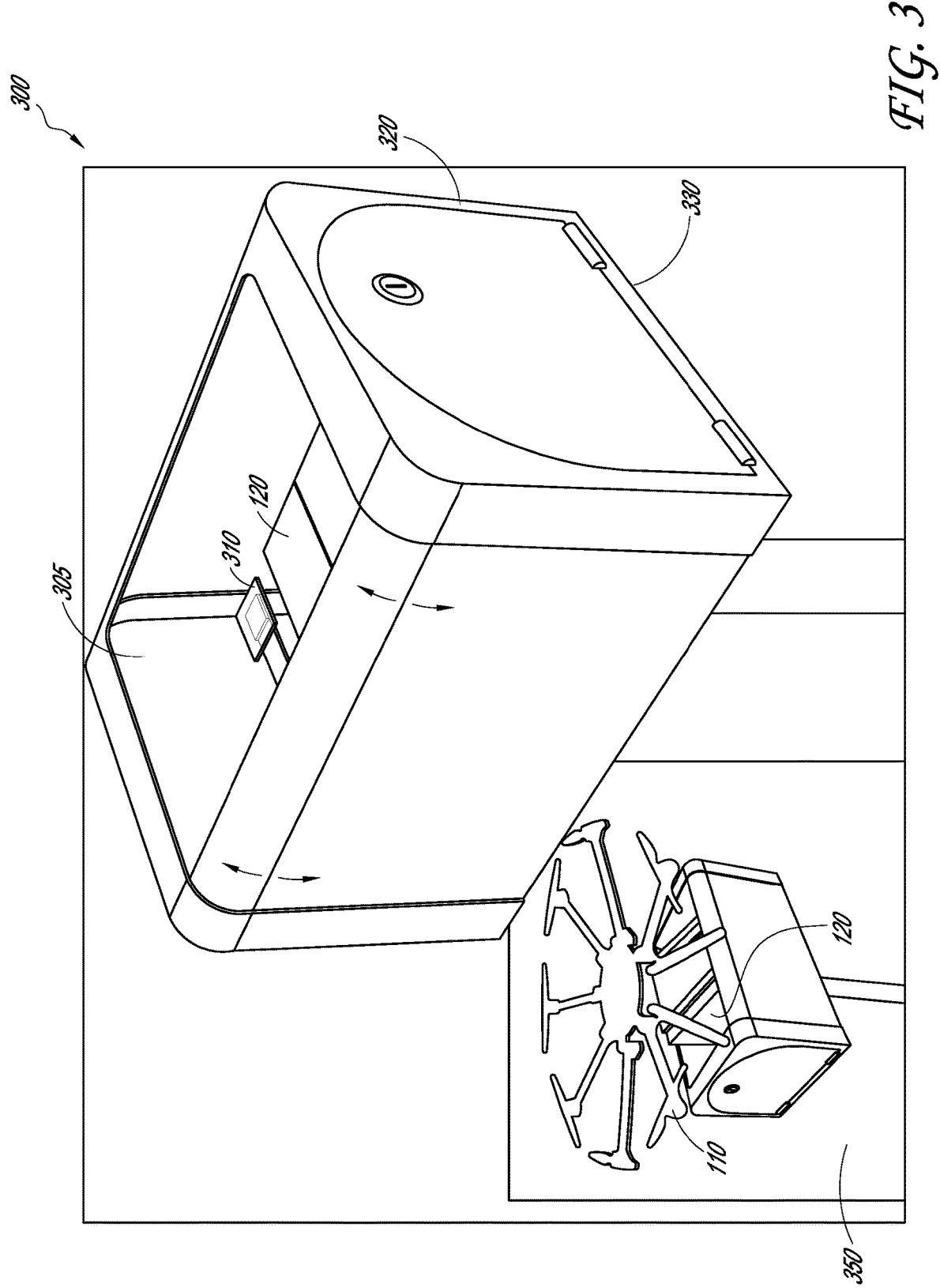
FIG. 3 shows an exemplary item deposit and/or pick up receptacle.

FIG. 3 shows an exemplary item receptacle 300. The receptacle 300 can be a delivery point such as a drop off location and/or a pick up location. The receptacle 300 includes an opening 305 in a top portion of the box to allow access to an item 120 stored inside. In some embodiments, the opening 305 may provide for access to the item 120 by an aerial ADU 110. The aerial ADU 110 may approach the receptacle 300 from above, descending through the opening 305 to pick up the item 120 from within the receptacle 300. The receptacle 300 also includes an interior platform 310. The interior platform 310 may be configured to enable an aerial ADU 110 to land at a loading/unloading position within the receptacle 300. From the loading/unloading position, the aerial ADU 110 may attach and/or detach from the item 120. The receptacle 300 may also be configured with one or more access door(s) 320. The access door 320 may be configured to provide access for a human to retrieve the item 120 from the receptacle 300 or store the item 120 in the receptacle 300. For example, the access door may be configured with hinges on one side of the door, and may include one or more of a locking mechanism and latching mechanism. The access door 320 may be located on any side panel of the receptacle 300. The receptacle 300 may include a bottom 330 that may be perforated in some embodiments to allow rain water and/or other fluids to drain out the bottom 330 of the receptacle 300. The inset 350 of FIG. 3 shows an aerial ADU 110 delivering the item 120 to the receptacle 300 via the opening 305.

In some embodiments, the receptacle 300 may include a lid portion. The lid portion may substantially cover the opening 305 in a first position, and may substantially expose the opening 305 in a second position. In some embodiments, the receptacle 300 may be equipped with actuating means for the lid, such as electric motors and/or gears, to provide for automated opening and/or closing of the lid portion. In some embodiments, a receptacle may include electronic controls that detect an approaching ADU 110, and autonomously open the lid to allow access to the opening 305 by the ADU 110. In some embodiments the electronic controls may autonomously close the lid when the ADU 110 departs a proximity of the receptacle 300. In some embodiments, the receptacle 300 may be configured with an active or passive proximity sensor. Exemplary active and passive proximity sensors are discussed below with respect to FIGS. 10 and 11. In some embodiments, an ADU may locate the receptacle 300 based on signals emitted from one or more of an active or passive proximity sensor. In some embodiments, signals from an active or passive proximity sensor may emit identification information for the receptacle 300. For example, a plurality of receptacles (not shown) may each be provided with a unique identification number. A corresponding plurality of proximity sensors may emit an identification number for their respective receptacles. As an ADU approaches a general location of the receptacle 300, the ADU 110 may detect a signal from a proximity sensor associated with the receptacle 300. The signal may provide an identification number. The ADU 110 may compare the identification number received from the proximity sensor to information associated with an item the ADU 110 may be tasked to either pick-up or deliver. If the comparison matches, the ADU 110 may determine that the signal received from the proximity sensor is for a receptacle associated with the item. The ADU 110 may then proceed to approach the receptacle 300 and pick-up/drop-off the item from/to the receptacle 300.

Figure 4:
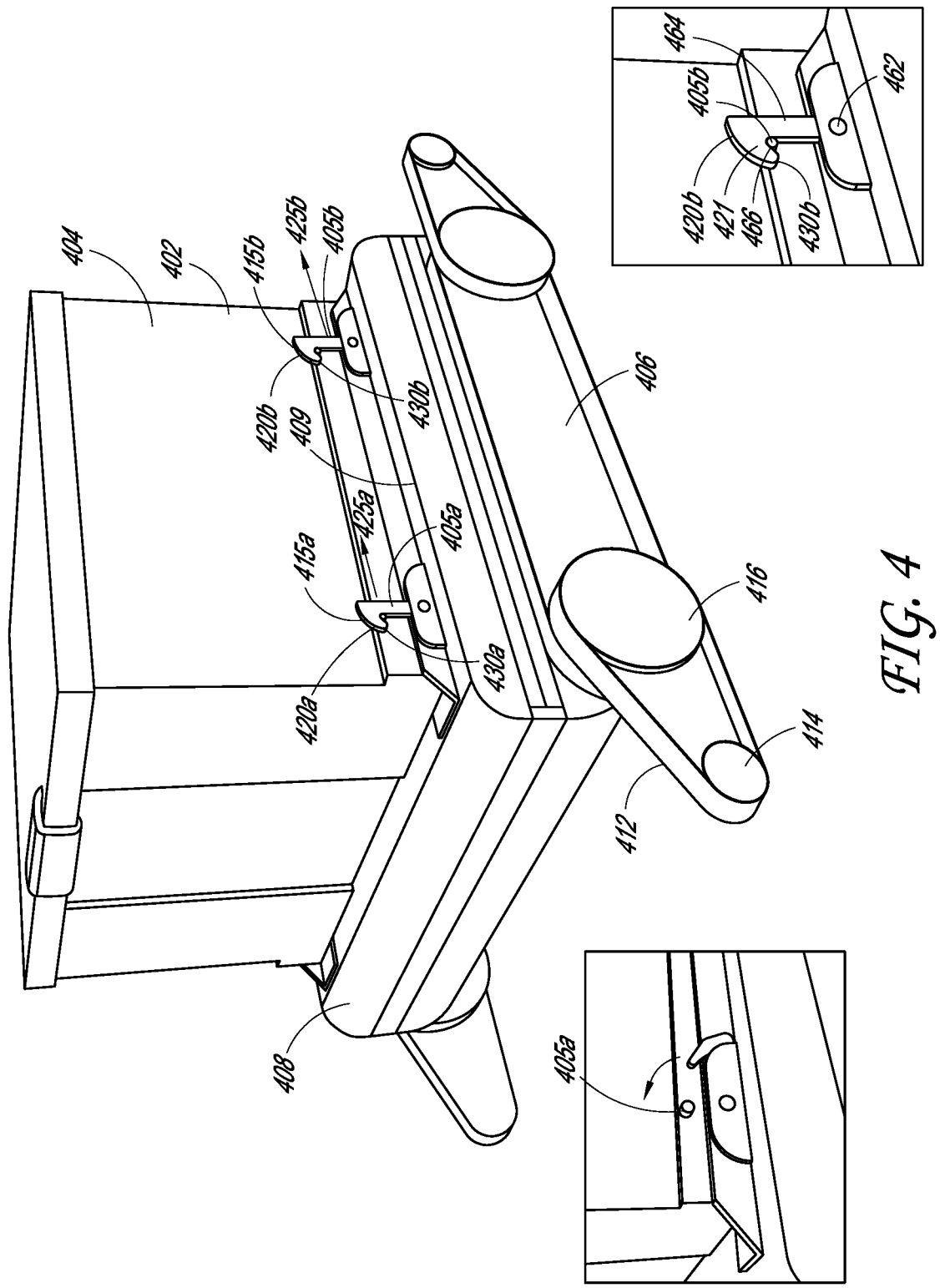
FIG. 4 shows an embodiment of an ADU carrying an item container.

FIG. 4 shows an exemplary ground-based ADU 110 carrying an item container 402. The item container 402 is configured to receive and enclose an item for delivery. In some embodiments, the item container 402 is considered the item, and the item itself can be configured similar to the item container 402 described herein below. The item container 402 is equipped with pins 405a, 405b. The pins 405a, 405b may be positioned on a lower portion of a first side 404 of the item container 402. An opposite side of the item container 402 (not shown) may also include pins in a similar configuration as the pins 405a, 405b.

The ADU 110 comprises a drive mechanism 406, a platform 408 configured to receive the item container 402, and hooks 415a, 415b. The drive mechanism includes a plurality of tracks 412. Each track includes a first wheel 414 and a second wheel 416. The hooks 415a, 415b are disposed along a first side 409 of the platform 408, and are configured to engage corresponding pins 405a, 405b on the item container 402. An opposite side of the ADU 110 (not shown) may also include hooks in a similar configuration as the hooks 415a, 415b. The hooks 415a, 415b are configured to securely attach the item container 402 to the ADU 110. As shown in one inset of FIG. 4, depicting a close up view of the hook 415b in a first, engaged position, the hooks 415a, 415b include a hinge point 462, an extension portion 464, and an engagement portion 421. The engagement portions 421 are contiguous with the extension portions 464 and extend at an angle from the extension portions 464 so as to create an engagement point 466 at the intersection of the extension portion 464 and the engagement portion 421. The extension portion 464 is connected to the hinge point 462. The hinge point 462 can be a point of rotation for the extension portion around an axis defined by the hinge point 462. The extension portion 464 can be moveable at the hinge point 462 by an electric or pneumatic motor, solenoid, or other similar actuation mechanism. Another inset of FIG. 4, shows a close up view of the hook 415b in a second, disengaged position.

In some embodiments, the engagement portion 421 has a curved engagement surface 420, 420a, 420b which enables the engagement portion 421 to generate a force on the pins 405a, 405b, as will be described in further detail below. In some embodiments, the engagement portion 421 comprises a first end 430, 430a, 430b opposite the engagement point 466.

In operation, the hooks 415a, 415b are moveable to facilitate engagement of the pins 405a, 405b at the engagement point 466 when the item container 402 is placed on the ADU 110 from a position above the ADU 110. In some embodiments, the hooks 415a, 415b are in an unlatched position (not shown). An item container 402 can be placed on the platform 408. When the item is placed on the platform 408, the hooks 415a, 415b are actuated, rotating about the hinge point 462 into the latched position depicted in FIG. 4, such that the engagement point 466 contacts the pin 405. In some embodiments, the curved engagement surface 420 slides along the pins 405 to impart a force to the pin 405, which pulls the item container 402 into a secured position against the platform 408. The hooks 415a, 415b can be rotated using a motor, solenoid, or other powered mechanism capable of exerting a torque about an axis.

In some embodiments, as the item container 402 is being placed on the platform 408, the pins 405a, 405b may engage a curved upper surface of the engagement surfaces 420a, 420b, causing the hooks 415a, 415b to move against a spring force in a direction indicated by the arrows 425a, 425b. As the pins 405a, 405b move past the first ends 430a, 430b of the extension portions 421a, 421b, the hooks 415a, 415b can be returned by the spring force, in a direction opposite the direction shown by the arrows 425a, 425b and into the position shown in FIG. 4, thereby engaging the pins 405a, 405b. In some embodiments, the spring force can be applied by a resilient member, a spring, a counterweight, or the like. In some embodiments, the force applied to the hooks 415a-415b may rely on a non-powered means, to ensure the engagement of the hooks 415a, 415b to the pins 405a, 405b persists in the event of an ADU malfunction, for example, if all power to the ADU is lost. In some embodiments, the ADU 110 may include a manual or powered mechanism to release the hooks 415a, 415b from the pins 405a, 405b. The mechanism may cause the hooks to move in the direction 425a, 425b such that the pins can disengage from the hooks 415a, 415b.

Figure 5:
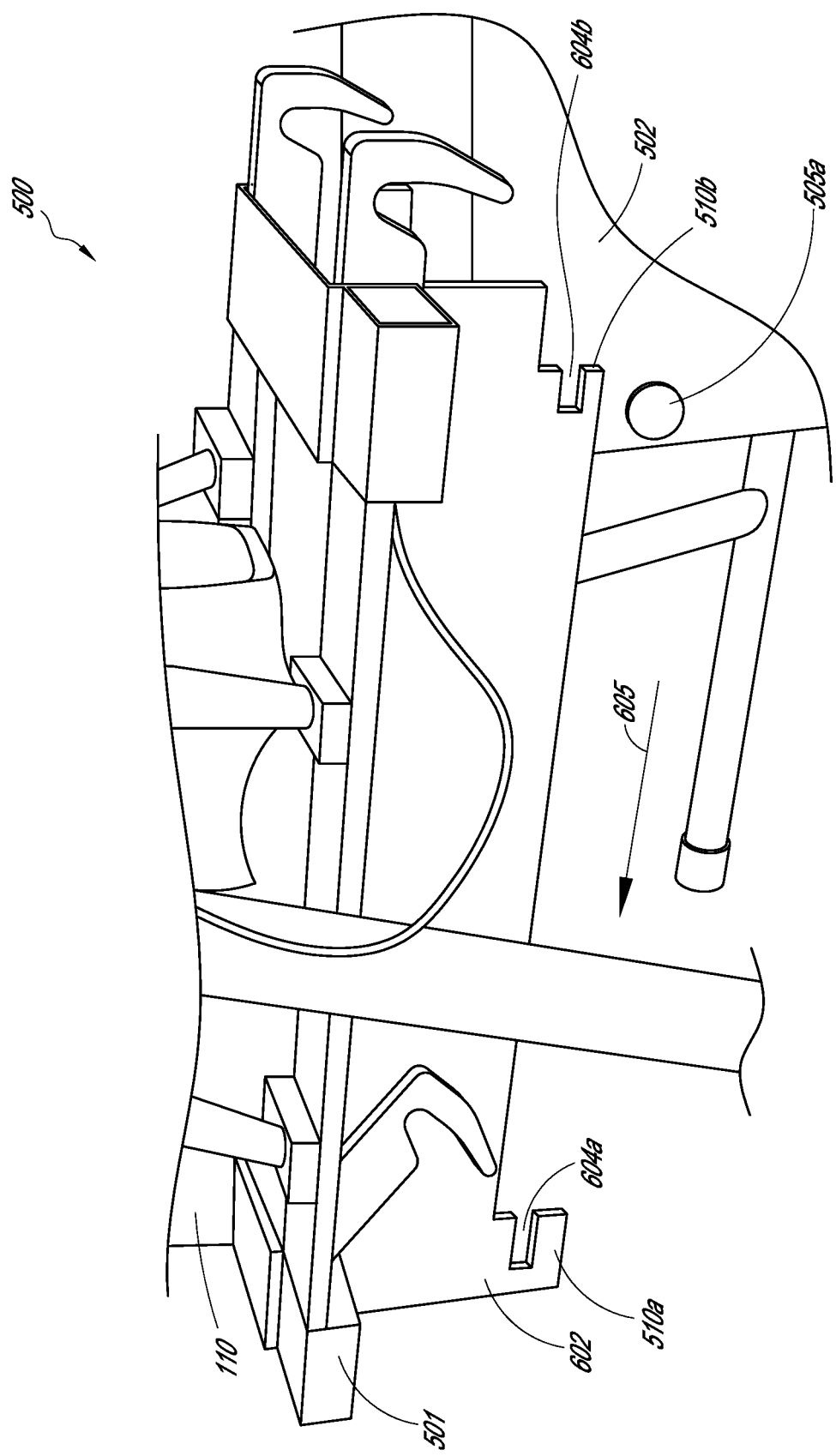
FIG. 5 shows another embodiment of a system for securing an item container or satchel to an aerial autonomous delivery unit (ADU).
Figure 6:
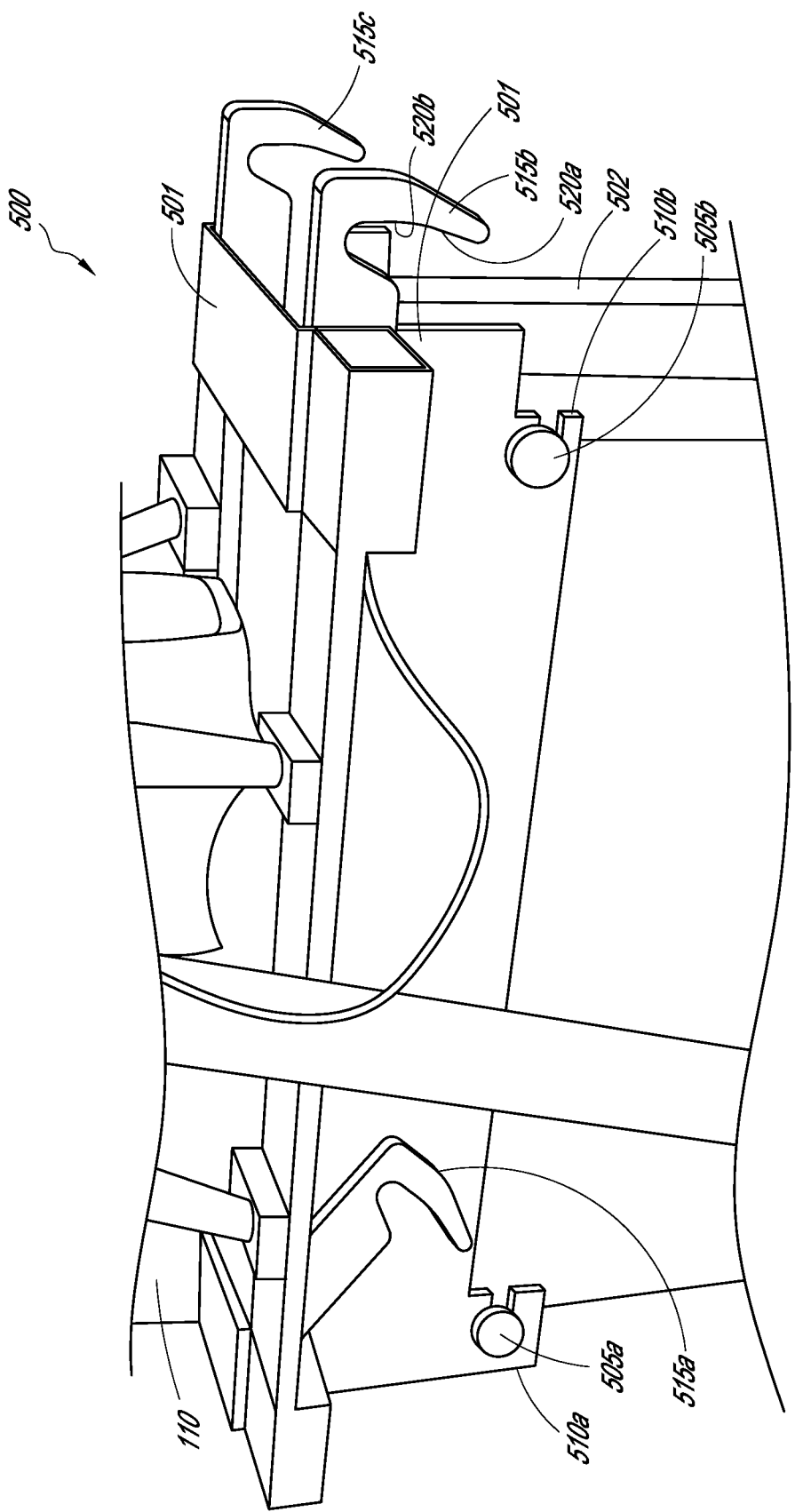
FIG. 6 shows another view of the attachment system of FIG. 5 during an attachment process.
Figure 7:
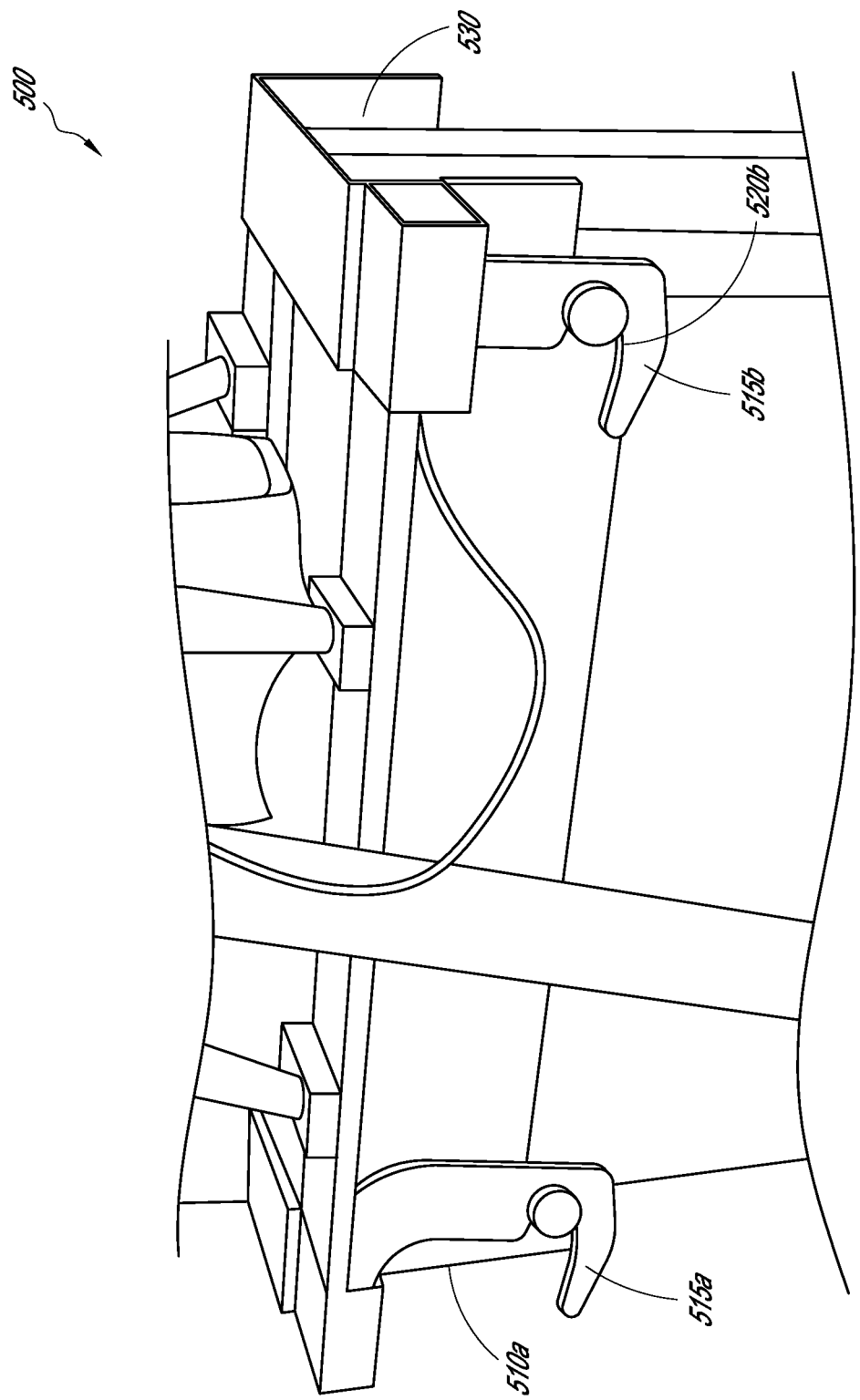
FIG. 7 shows another view of the attachment system of FIGS. 5 and 6 during the attachment process.

FIGS. 5-7 depict another embodiment of an attachment system 500 for securing an item container or satchel to an aerial ADU 110. Generally described, the attachment system 500 can be located on an underside of an aerial ADU 110 for securing a corresponding item or item satchel 502 to the ADU 110. In sequence, FIGS. 5-7 illustrate a process of picking up an item by the ADU 110 using the attachment system 500. As shown in FIG. 5, an item satchel 502 is in a position suitable for carriage by the ADU 110. The item satchel 502 may provide for carriage of an item contained within.

Referring jointly to FIGS. 5-7, the attachment system 500 generally includes a frame 501, fixed latches 510a, 510b, and hooks 515a-515c which are attached directly or indirectly to the frame 501 (fixed latches 510c, 510d and hook 515d are similar structures located on the distal side of the attachment system not shown in FIGS. 5-7). The exemplary fixed latch 510a is shown to include a latch extension 602 attached to the frame 501. The latch extensions 602 include slots 604a, 604b configured to accept pins 505a and 505b of the item satchel 502. As shown in FIGS. 6-7, the item satchel 502 includes pins 505a-505d (505c, 505d on distal side of item satchel 502 not shown in FIGS. 5-7). An opposite side of the item satchel 502 (not shown) may be similarly configured with the pins 505c, 505d and the hook 515a. In some embodiments, the item satchel 502 may be the delivery item itself, but may still comprise pins 505a-505d. In these embodiments, there may not be an item satchel 502 separate from the item itself. In some embodiments, the satchel 502 may have fewer or more pins than the exemplary item satchel 502 of FIG. 5. In some embodiments, the item satchel 502 may include at least two portions which form an enclosure in which an item is carried. The two portions may be configured to open to allow insertion and removal of an item. For example, the satchel may comprise a bottom portion, and a top portion. In some embodiments, the two portions may be connected via a hinge. After insertion of an item within one of the two portions, the two portions may be configured to be joined together via a latch system.

The frame 501 provides structural support for the attachment system 500. In some embodiments, at least one, two three, four or more hooks 515a-515c may be utilized to secure the item satchel 502 to the frame 501 via the pins 505a-505b and other hooks and pins which are not visible in FIGS. 5-7. In some embodiments, the satchel 502 may be secured to the frame 501 via a combination of fixed latches and hooks. For example, the fixed latches may provide a mounting point for two or more of the pins 505a-505d. In these embodiments, additional hooks may press the two or more pins 505a-505d against the fixed latches. In one example, only two hooks 515b, 515c may be provided, with the hooks 515b, 515c providing sufficient force to retain all four pins 505a-505d within their respective fixed latches 510a-510d.

FIG. 5 depicts an initial position of the attachment system 500 and item satchel 502 prior to attaching the item satchel 502 to the ADU 110. As a first step in attaching the item satchel 502 to the attachment system 500, the item satchel 502 may be slid horizontally in the direction of arrow 605 into the carry position depicted in FIG. 6. Alternatively or in addition, the ADU 110 may move in a direction opposite the arrow 605 while the item satchel 502 remains stationary. For example, the item satchel 502 may be slid by a user when the loading of the item satchel 502 to the ADU 110 is being performed at least partially by the user. When the ADU 110 attaches the item satchel 502 autonomously without user intervention, the ADU 110 may approach the item satchel 502 in the position shown in FIG. 5, before moving horizontally opposite the arrow 605 to engage the item satchel 502 in the carry position of FIG. 6.

As the item satchel 502 and/or ADU 110 move into the carry position, the pin 505a engages the slot 604a of the fixed latch 510a. The pin 505b may similarly engage the slot 604b of the fixed latch 510b. Thus, in the carry position of FIG. 6, the pin 505a is shown engaged within the fixed latch 510a, and the pin 505b is shown engaged within the fixed latch 510b. As shown in FIG. 6, the hooks 515a-515d are in a disengaged position, allowing the pins 505a-505d to engage the fixed latches 510a-510d. Hooks 515a, 515b may be configured to engage pins 505a, 505b respectively when rotated to an engaged position. Hook 515c may be configured to engage a pin 505c positioned on an opposite side of the item satchel 502, and a similarly configured hook 515d (not shown) may be configured to engage a pin 505d (not shown) positioned opposite the item satchel 502 from pin 505a.

As shown in FIG. 6, exemplary hook 515b includes a first pin engagement surface 520a and a second pin engagement surface 520b. When the hook 515b is rotated from the disengaged position to the engaged position (as shown in FIG. 7), it passes through an intermediate position where the first pin engagement surface 520a engages the pin 505b, at a first distance from the frame 501 of the attachment system 500 This first distance may facilitate ensuring the engagement surface 520a of the hook 515b passes beneath the pin 515b. The first distance may be such that an adequate margin exists between the engagement surface 520a and the pin 505b given manufacturing tolerances of the hook 515b, pin 505b, item satchel 502, and the attachment system 500. As the hook 515b continues toward a vertical position, the second engagement surface 520b may engage the pin 505b. Engagement of the second engagement surface 520b with the pin 505b may cause the item satchel 502 to be drawn securely to the frame 501 of the attachment system 500. Hook 505a may be configured with a similar first and second engagement surface. Furthermore, in some embodiments, the attachment system 500 may include two additional hooks positioned on an opposite side of the engagement system 500.

Thus, FIG. 7 depicts the attachment system 500 in a final position after the hooks 515a-515d have rotated as described above. In FIG. 7, the hooks 515a, 515b are shown in a vertical, engaged position, so as to secure the item satchel 502 to the ADU 110. As shown, the second engagement surface 520b of the hook 515b has engaged the pin 505b so as to secure the item satchel 502 to the frame 501 of the attachment system 500. With the item satchel 502 secured as shown in FIG. 7, the ADU 110 may begin traveling to a delivery point of the item satchel 502 (e.g., a drop-off location, a receptacle, or the like). The pins 505a-505d are secured between the fixed latches 510a-510d and the hooks 515a-515d such that the item satchel 502 remains rigidly fixed to the ADU 110 during travel. When the ADU 110 arrives at the delivery point, the attachment process depicted in FIGS. 5-7 may be reversed. From the position depicted in FIG. 5, the ADU 110 may travel away from the item satchel 502, leaving the item satchel 502 behind at the delivery point.

Figure 8:
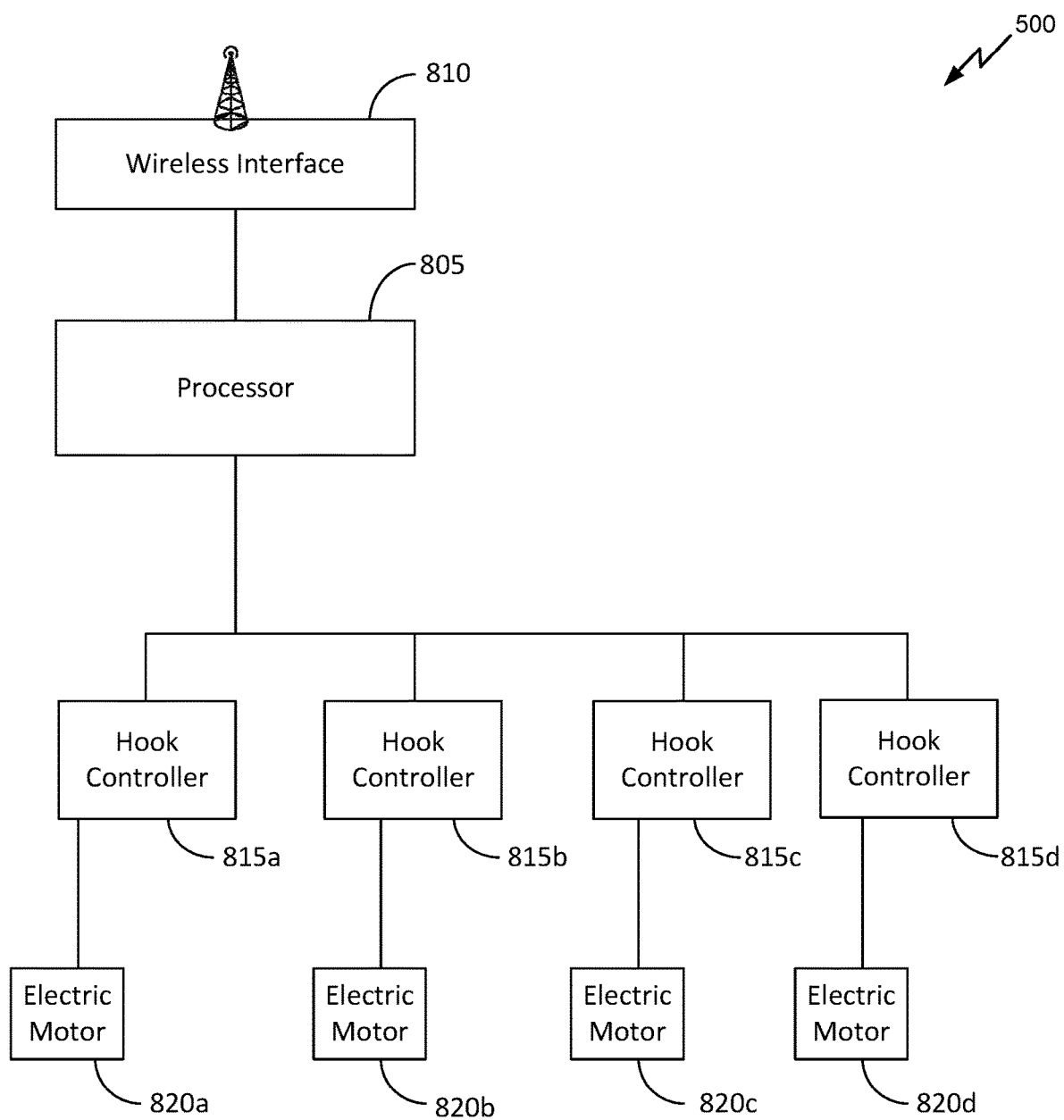
FIG. 8 is a structured block diagram of a portion of an exemplary attachment system.

FIG. 8 is a structured block diagram of a portion of the exemplary attachment system 500. In some embodiments, the attachment system 500 may be mounted to an ADU 110. The attachment system 500 includes an electronic hardware processor 805, a wireless interface 810, and four hook electronic controllers 815a-815d. Each hook controller 815a-815d is coupled to at least one of electric actuators 820a-820d respectively. In some embodiments, the electric actuators 820a-820d may be electric motors. The electronic hardware processor 805 may communicate with an attachment control system (not shown) over a wireless connection via the wireless interface 810. In response to commands received via the wireless interface 810, the processor 805 may command one or more of the hook controllers 815a-815d to move one or more corresponding hooks, such as the hooks 515a-515d illustrated in FIGS. 5-7, into an engaged or disengaged position. For example, the processor 805 may command the hook controller 815a to move the hook 515a from a position shown in FIG. 6 to a position shown in FIG. 7. The hook controller 815a may provide power to the electronic motor 820a in response to the command. The electric motor 820a may be mechanically connected to the hook 515a as illustrated in FIG. 5, such that when engaged, the electric motor causes the hook 515a to move. In response to a second command, the processor 805 may command the hook controller 815a to move the hook 515a from the position shown in FIG. 7 to the position shown in FIG. 5.

Figure 9:
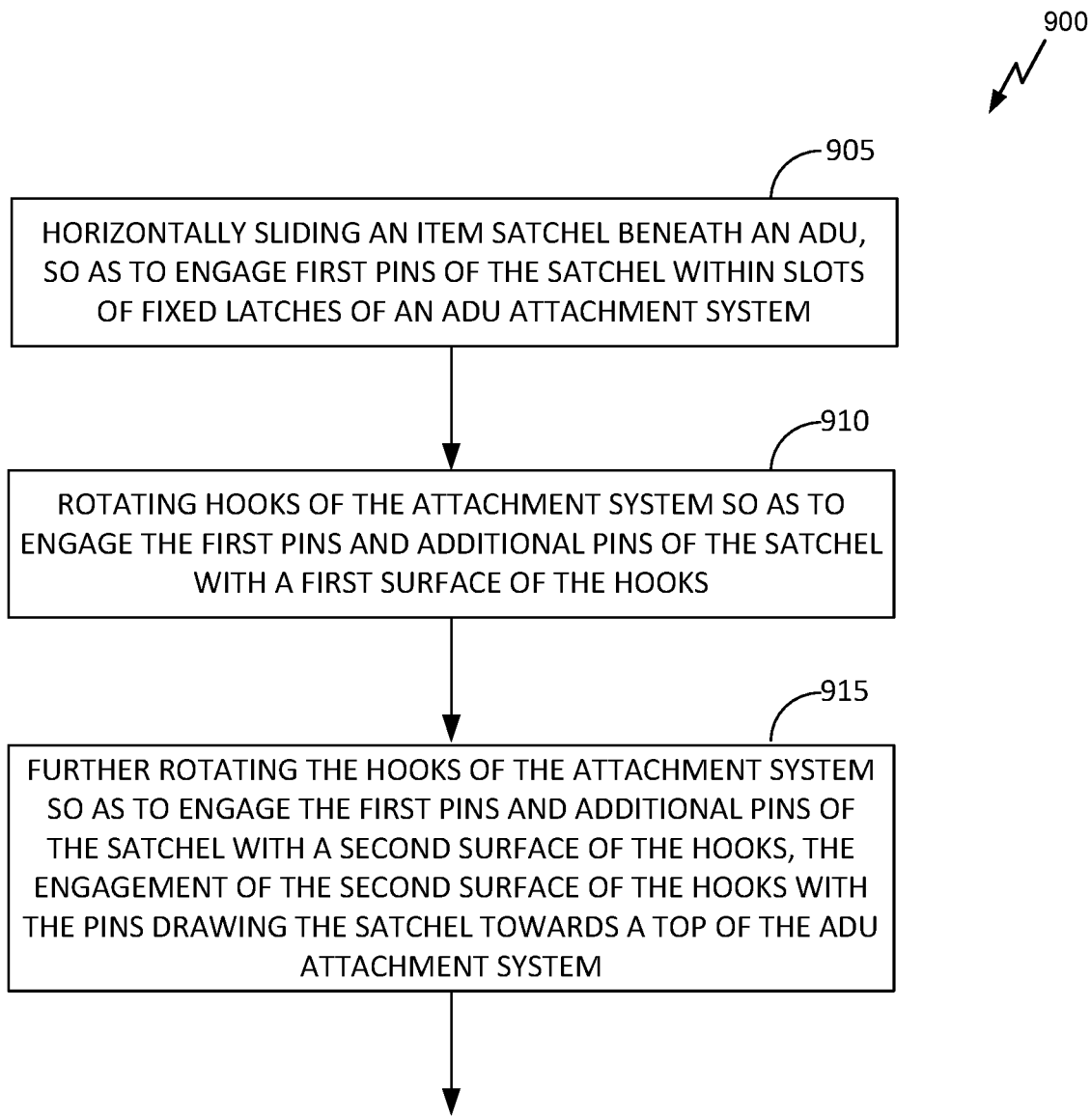
FIG. 9 is a flowchart of a method for attaching an item satchel to an ADU.

FIG. 9 is a flowchart of a method for attaching an item satchel to an ADU. In some embodiments, the method may attach an item to an aerial UAV item attachment system, such as that illustrated in FIGS. 5-8 above. In some embodiments, at least some portions of the process 900 of FIG. 9 may be performed by the processor 805 discussed above with respect to FIG. 8.

In block 905, an item satchel is moved horizontally beneath an aerial ADU, such as the ADU 110 illustrated in FIGS. 5-7. In some embodiments, block 905 may be performed by a human operator, who manually positions the satchel beneath the ADU and the attachment system. In some embodiments, an automated means, such as a conveyer system or robotic satchel movement system, may perform block 905. In some embodiments, the ADU may be moved into position near the item satchel, and moved horizontally relative to a stationary item satchel in order to move the fixed latch 510a into contact with one or more pins 505.

In block 910, hooks of the attachment system are rotated so as to engage the first pins and additional pins of the satchel with a first surface of the hooks. As illustrated in FIGS. 5-7, a hook 515b of the attachment system 500 may be rotated so as to engage a first surface 520a with the pin 505b. Other hooks, such as the hooks 515a and 515c, 515d (515d not visible in FIG. 5) may also be rotated to engage corresponding pins with a similar first surface. In some embodiments, block 910 may be performed by the processor 805 of FIG. 8. In some embodiments, the processor 805 may receive a command via the wireless interface 810 to rotate the hooks of the attachment system. In response, the processor 805 may send a command to one or more of the hook controllers 815a-815d. The hook controllers may send electrical power to the electric motors 820a-820d. The electric motors 820a-820d may be mechanically connected to the hooks 515a-515d, so as to rotate the hooks.

In block 915, the hooks are further rotated so as to engage the first pins and additional pins of the satchel with a second surface of the hooks. The engagement of the second surface of the hooks with the pins draws the satchel toward a frame 501 of the ADU attachment system. For example, as discussed with respect to FIG. 5, in some embodiments the hooks 515a-515d include first and second surfaces 520a, 520*b* respectively. In these embodiments, engagement of the first surface 520*a* of the hook 515*b* with the pin 520*b* positions the item satchel 502 at a first distance from the frame 501 of the attachment system 500. As the hook 515*b* continues to rotate into a vertical position, the pin 505*b* is engaged by the second surface 520*b* of the hook 515*b*. Engagement with the second surface 520*b* causes the satchel 502 to be drawn up to a second position with a second distance, closer to the frame 501 of the attachment system than when the pin 505*b* is engaged by the first surface 520*a* of the hook 515*b*. Block 915 may include rotation of at least four hooks, such as hooks 515*a*-515*d* discussed above with respect to FIG. 5, to engage four corresponding pins, such as pins 505*a*-515*d* of FIG. 5 with second surfaces of each of the hooks 515*a*-515*d* (only second surface 520*b* of hook 515*b* is shown in FIG. 5 to preserve figure clarity).

Figure 10:
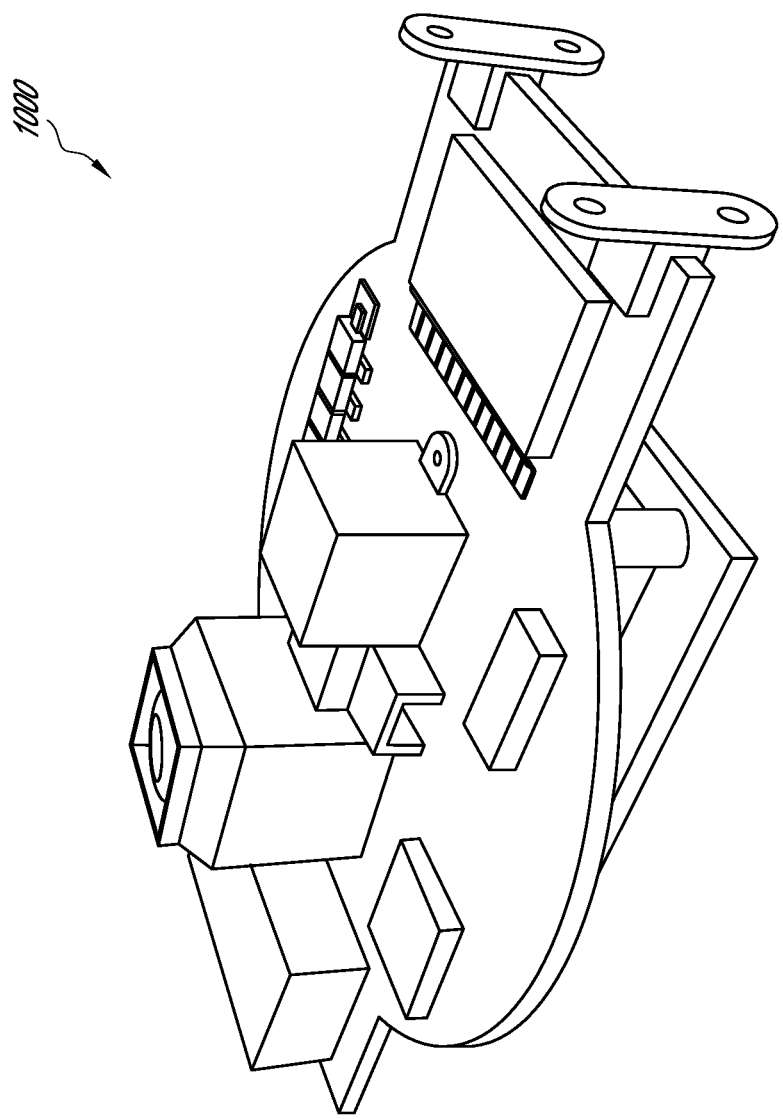
FIG. 10 is an exemplary proximity sensor.

FIG. 10 depicts an exemplary proximity sensor 1000. In some embodiments, the proximity sensor 1000 may be physically positioned at an item pick-up and/or drop off location, such as the receptacle 300 illustrated in FIG. 3. The proximity sensor 1000 may be configured to emit a signal that may be detectable by an ADU 110. The ADU 110 may utilize the signal emitted by the proximity sensor to determine a landing position so as to pick-up or deliver an item. In some embodiments, the proximity sensor 1000 may utilize RFID technology. In some of these embodiments, the proximity sensor 1000 may be configured to emit an RFID signal when a nearby ADU 110 emits a magnetic field configured to energize the proximity sensor 1000. In some embodiments, the proximity sensor 1000 may be an active RFID tag. As such, in these embodiments, the proximity sensor 1000 may be internally powered via a battery, or may receive external power, from, in some embodiments, a wall source or other source of electric power.

Figure 11:
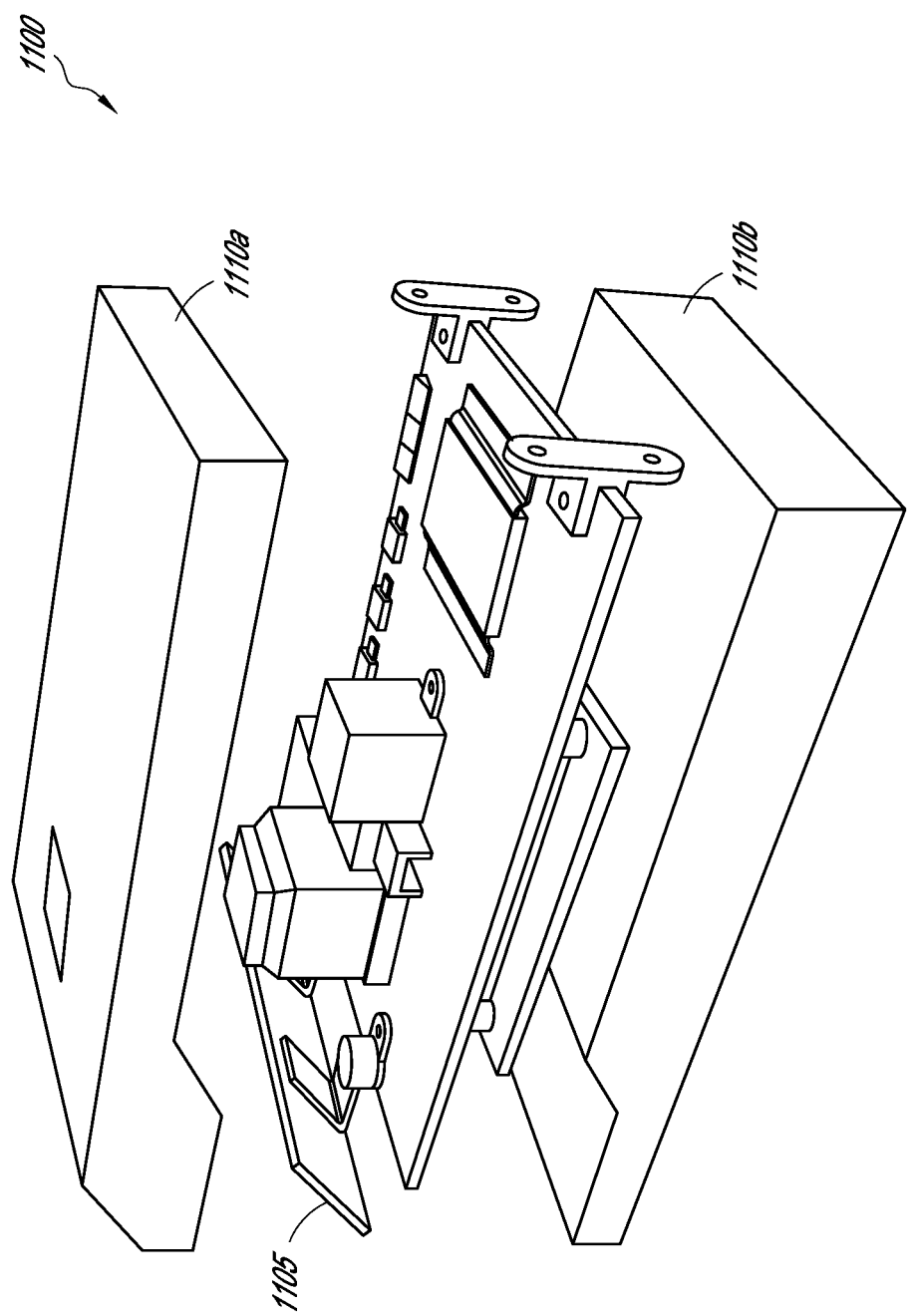
FIG. 11 is an exemplary proximity sensor.

FIG. 11 depicts a further embodiment of an exemplary proximity sensor. The proximity sensor 1100 may, in some embodiments, may be physically positioned at an item pick-up and/or drop off location, such as a position proximate to the receptacle 300 illustrated in FIG. 3. In some embodiments, the proximity sensor 1100 may be powered via one or more solar cells 1105. The proximity sensor 1100 may utilize passive or RFID technology to emit a signal. An ADU 110 may be configured to adjust its course and/or landing position so as to pick up or drop off an item based on the emitted signal. In some embodiments, the proximity sensor 1100 will include an outer casing 1110. The outer casing 1110 may be divided into at least two parts, shown in FIG. 11 as an upper and a lower outer casing 1110*a-b* respectively. As discussed above, in some embodiments, one or more of the proximity sensors 1000 or 1100 of FIGS. 10-11 may be included with the receptacle 300 of FIG. 3.

Figure 12:
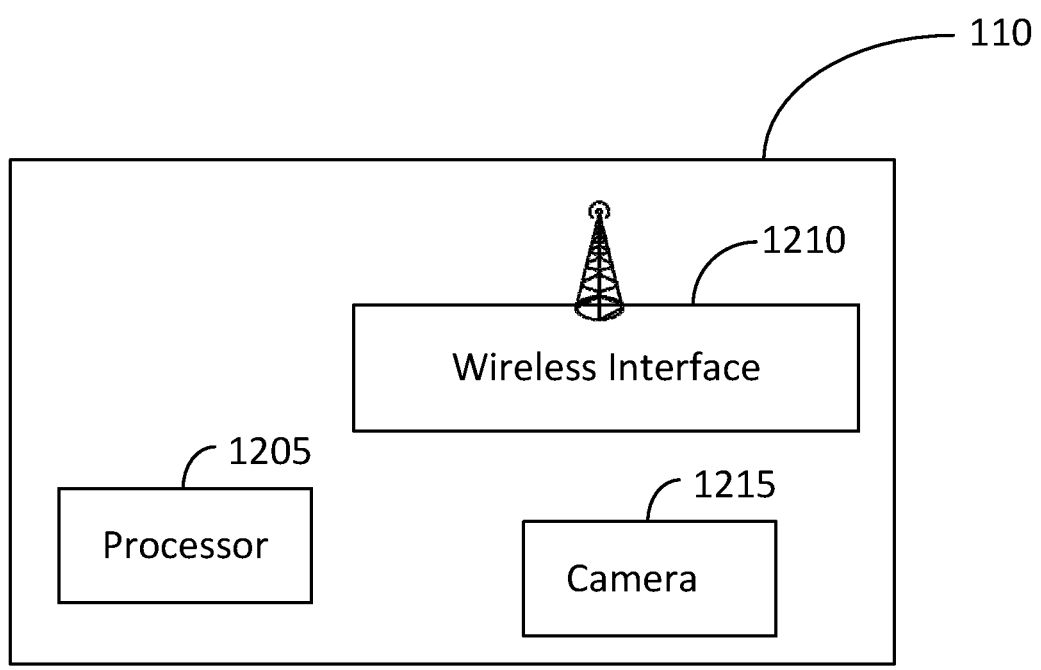
FIG. 12 is an exemplary block diagram of an ADU.

FIG. 12 is an exemplary block diagram of an ADU 110. The ADU 110 of FIG. 12 includes an electronic hardware processor 1205, and a wireless interface 1210. In some embodiments, the electronic hardware processor 1205 may be configured to control the ADU 110, such as navigation functions of the ADU 110. In some embodiments, the processor 1205 may be configured to receive a beacon or other locating signal generated by the ADP 200 of FIG. 2, or the satchel 502 of FIGS. 5-7, or the proximity sensor 1100, via the wireless interface 1210. In some embodiments, the ADU 110 may perform its navigation functions based on the received beacon. For example, the electronic hardware processor 1205 may be configured to steer the ADU 110 to the ADP 200 via the beacon.

In some embodiments, the electronic hardware processor 1205 may be configured to receive a signal from a proximity sensor, such as one or more of the proximity sensors 1000 or 1100 discussed above with respect to FIGS. 10 and 11 via the wireless interface 1210. The electronic hardware processor 1205 may be configured to navigate the ADU 110 towards the proximity sensor. In some embodiments, the proximity sensor may be positioned within an embodiment of the receptacle 300 of FIG. 3. In some embodiments, the electronic hardware processor 1205 may be configured to navigate the ADU 110 to the interior platform 310 based on the signal from the proximity sensor.

In some embodiments, the ADU 110 can include a camera 1215 in communication with the processor. The camera 1215 can provide visual information to the electronic hardware processor 1205, such as directions to a pick-up or delivery point. For example, a delivery point may have a computer readable code, such as a QR code or a barcode on the ground, a platform, or other structure at the delivery point. The camera 1215 can image the computer readable code and, with the processor 1205 and the wireless interface 1210 can determine the identity of the delivery point, and determine whether the imaged delivery point is the intended destination for the item carried by the ADU 110. In some embodiments, the delivery point may have a distinct visual patter or other feature which the ADU 110 can recognize as a specific delivery point.

In some embodiments, the computer readable code at a delivery point may encode information regarding the delivery point, including address, recipient name, customer preferences, specific directions to the drone, GPS coordinates, and the like which the camera 1215 can image, and the processor 1205 can decode, and instruct the ADU 110 accordingly.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. An item attachment system, comprising:
   an attachment system frame;
   a satchel comprising a plurality of external pins;
   a plurality of hooks, mechanically attached to the frame, each hook comprising a first engagement surface and a second engagement surface;
   one or more electric actuators, mechanically attached to the frame, and mechanically connected to the plurality of hooks, the one or more electric actuators configured to rotate the hooks between a horizontal and a vertical position; and
   an electronic controller, configured to energize the one or more electric actuators to rotate the hooks from the horizontal to the vertical position, such that each of the first engagement surfaces engages a corresponding pin of the plurality of external pins at a first position between the horizontal and vertical positions, and each of the second engagement surfaces engage the corresponding pin of the plurality of external pins at the vertical position.

2. The item attachment system of claim 1, further comprising a fixed latch, mechanically attached to the frame, and configured to horizontally engage a pin of the plurality of pins.

3. The item attachment system of claim 1, wherein the satchel comprises a bottom portion and a top portion movably coupled to the bottom portion by a hinge.

4. The item attachment system of claim 1, wherein the electronic controller is further configured to rotate the hooks from the vertical position to the horizontal position, so as to release the satchel from the attachment system frame.

5. The item attachment system of claim 4, further comprising an autonomous delivery vehicle mechanically attached to the attachment system frame.

6. The item attachment system of claim 5, wherein the autonomous delivery vehicle further comprises a control processor configured to:
detect a signal from a proximity sensor associated with a delivery point; and
navigate the autonomous delivery vehicle based on the signal.

7. The item attachment system of claim 6, wherein the proximity sensor is located proximate to a receptacle, and wherein the control processor is further configured to navigate the autonomous delivery vehicle to the receptacle based on the signal from the proximity sensor.

8. The item attachment system of claim 7, wherein the control processor is further configure to land the autonomous delivery vehicle on an interior platform of the receptacle based on the signal from the proximity sensor.

9. The item attachment system of claim 7, wherein the control processor is further configured to move at least a portion of the autonomous delivery vehicle through an opening of the receptacle based on the signal from the proximity sensor.

10. The item attachment system of claim 5, wherein the satchel further comprises a beacon generator configured to generate a beacon signal, and wherein the autonomous delivery vehicle further comprises a control processor, the control processor configured to detect the beacon signal and navigate the autonomous delivery vehicle based on the beacon signal.

11. An autonomous delivery vehicle comprising:
an attachment system comprising:
a plurality of fixed latches, each fixed latch comprising a slot configured to accept an external pin of an item;
a plurality of hooks, each hook associated with a corresponding one of the plurality of fixed latches, each hook rotatable between a first orientation in which an external pin can enter or leave the corresponding fixed latch, and a second orientation in which an external pin is prevented from entering or leaving the corresponding fixed latch; and
one or more electric actuators mechanically connected to the plurality of hooks, the one or more electric actuators configured to rotate the plurality of hooks between the first orientation and the second orientation; and
a control processor configured to:
detect wireless signals associated with at least one of an item and a delivery point; and
navigate the autonomous delivery vehicle based at least in part on the wireless signal.

12. The autonomous delivery vehicle of claim 11, wherein each hook comprises a first engagement surface and a second engagement surface, and wherein the control processor is further configured to energize the one or more electric actuators so as to rotate the hooks from the first orientation to the second orientation, such that each of the first engagement surfaces engages a corresponding external pin of the item at a first position between the first orientation and the second orientation, and each of the second engagement surfaces engage the corresponding pin at the second orientation.

13. The autonomous delivery vehicle of claim 11, wherein the wireless signals comprise a location signal associated with an item to be picked up, and wherein the control processor is further configured to:
navigate the autonomous delivery vehicle to a location associated with the location signal;
cause the autonomous delivery vehicle to move into a carry position such that a plurality of external pins of the item are engaged within the fixed latches;
cause the one or more electronic actuators to rotate the plurality of hooks from the first orientation to the second orientation to secure the item to the autonomous delivery vehicle by retaining the external pins within the fixed latches; and
navigate the autonomous delivery vehicle away from the location while the item is secured to the autonomous delivery vehicle.

14. The autonomous delivery vehicle of claim 11, wherein the wireless signals comprise a beacon signal emitted from a predetermined location of the item, and wherein the control processor is further configured to cause the autonomous delivery vehicle to move into a carry position relative to the item based at least in part on the beacon signal.

15. The autonomous delivery vehicle of claim 11, wherein the wireless signals comprise a location signal associated with a delivery point for an item being carried by the autonomous delivery vehicle, and wherein the control processor is further configured to:
navigate the autonomous delivery vehicle to a location associated with the location signal;
cause the one or more electronic actuators to rotate the plurality of hooks from the second orientation to the first orientation to release the item from the autonomous delivery vehicle by releasing the external pins from the fixed latches; and
navigate the autonomous delivery vehicle away from the item.

16. The autonomous delivery vehicle of claim 15, wherein the location signal is associated with a receptacle comprising an opening, and wherein the location associated with the location signal comprises a location in which at least a portion of the autonomous delivery vehicle is disposed within the opening and the item is disposed within the receptacle.

17. The autonomous delivery vehicle of claim 11, wherein the fixed latches are sized and spaced to accommodate external pins of an item satchel having external pins in a predetermined arrangement compatible with the autonomous delivery vehicle.

18. The autonomous delivery vehicle of claim 11, wherein the attachment system further comprises a spring force element configured to retain the hooks in the second orientation.

19. The autonomous delivery vehicle of claim 11, wherein the autonomous delivery vehicle comprises an unmanned aerial vehicle.

20. The autonomous delivery vehicle of claim 11, further comprising a plurality of wheels for travel along the ground.

* * * * *